Patented Dec. 10, 1940

2,224,135

UNITED STATES PATENT OFFICE 2,224,135

MAKING BOARD PRODUCTS AND RECOVERING WATER SOLUBLES FROM FIBROUS LIGNO-CELLULOSE MATERIAL

Robert M. Boehm, Laurel, Miss., assignor to Masonite Corporation, Laurel, Miss., a corporation of Delaware No Drawing. Application December 1, 1936, Serial No. 113,607

6 Claims. (Cl. 92—2)

My invention relates to the making of board products and the recovery of water solubles from fibrous ligno-cellulose material.

It is an object of the invention to do away with or greatly diminish the necessity for washing ligno-cellulose material for removal or reduction of water soluble constituents contained therein, together with eliminating excessive dilution of water solubles produced by such washing, eliminating the running to waste of the wash water laden with water solubles and fine solids, and avoiding pollution of streams, production of noxious odors, and the like evils, consequent upon the running of such materials to waste.

Another object of the invention consists in collecting water solubles from heat-treated ligno-cellulose material in concentrated state well adapted for recovery and derivation of products of value therefrom.

A further object of the invention consists in avoiding loss of solid fines in connection with removal or reduction of water soluble constituents of heat-treated ligno-cellulose material by expressing a liquor containing the water solubles or a large part thereof, while utilizing the solid portions as a filter mat to retain the solid fines.

Further objects will appear from the following description of illustrative embodiments of the invention.

Ligno-cellulose material for use with my invention can be obtained from wood of trees and from the woody material of cornstalks, cane and other vegetables growths.

When ligno-cellulose material, such as wood in chip form, for example, is heat-treated and subdivided, as for example by exposing chips to heating and penetration by steam in a closed chamber and exploding by discharge to a region of lower, preferably atmospheric, pressure, the resulting subdivided ligno-cellulose material contains water soluble materials in considerable proportions.

The proportion of water soluble material depends principally, with any given source of ligno-cellulose material, such as gum wood, pine wood, or annual growths such as cane, cornstalks, etc., upon the steam pressure and corresponding temperature and upon the time of exposure to such temperature and pressure. The proportion of water soluble materials so produced is ordinarily under 25%, but may be even higher.

In manufacturing products such as hardboards, insulating boards, plastic materials and products, and the like, from such subdivided ligno-cellulose material, great reduction in the content of water solubles is desirable because retention of the water soluble materials and presence thereof in the products tends to lower the resistance of the products to absorption of water.

Heretofore the subdivided ligno-cellulose material has been washed for reduction of the water soluble content, but such washing has various features of disadvantage including the following:

The water requirements are large and can readily exceed the supply of satisfactory water available, particularly at locations having a limited water supply. Cost of power for circulating and otherwise handling the wash water is considerable.

The water solubles are so highly diluted in the wash water, as for example to about .4–1.5%, that recovery of the water solubles from the water is not commercially practicable, and consequently the wash water is normally run to waste, with resulting stream pollution, production of noxious odors, and the like.

In the dewatering of subdivided ligno-cellulose material containing solid fines, a considerable proportion of solid fines material passes through the separating devices, such as outlet screens, however fine the mesh of such screens, and is lost with the wash water, thereby reducing the quantity of stock available for making of board and other products and adding to stream pollution, etc.

Even if it were practicable to recover the dissolved and suspended matter, consisting principally of water solubles and solid fines, by evaporation of large quantities of wash water, volatile constituents would be lost.

By the present invention, washing for removal of water solubles is eliminated or substantially eliminated, and the water soluble materials are recovered in relatively highly concentrated form and the loss of solid fines and loss of volatile constituents are prevented.

The ligno-cellulose starting material, such as wood chips, contains a substantial proportion, as about 30% or more, of water. When steam is used for heat-treating and explosion, some condensation of steam takes place as the material cools. Thus the resulting heat-treated and subdivided ligno-cellulose material may contain a substantial portion as, say, 50% of water.

I have found that by expressing a liquor from the heat-treated and subdivided ligno-cellulose material, the water solubles are largely removed along with water in which they are dissolved or become dissolved in quite highly concentrated state, and that the subdivided heat-treated ligno-cellulose material forms substantially its own filter mat for the purpose of expression treatment, whereby the solid fines are substantially all retained, so that the expressed liquor consists principally of a practically filtered concentrate of water solubles that is substantially free from solid fines.

While expressing apparatus of various kinds may be used for this purpose, I prefer to make use of an expeller of the screw type, so arranged and constructed that the sectional area traversed by the material moved by the screw becomes progressively smaller, thereby compressing the material and expressing a considerable proportion of the liquor through outlets provided for such purpose, and finally discharging, separately from the liquor, the solid material with a reduced content of water and water solubles.

In order to secure the highest concentration of water solubles, expressed liquor may be returned at least in part and added to fresh quantities of the subdivided ligno-cellulose material. An arrangement of two or more expellers in series, with feeding back of the liquor expressed, to be passed again through earlier expellers in the series, may be used to aid in securing more thorough removal of water soluble materials and obtaining high concentration thereof in the watery liquor. The subdivided ligno-cellulose material extruded by the expeller screw soaks up liquor very readily and intimate mixing of expressed liquor therewith is easy.

With expression of the liquor containing water solubles in these and other ways by means of pressure application, the subdivided ligno-cellulose material in the pressure device forms its own filter mat wherein the solid fines are retained, there is little or no loss of the fine solid materials, and the liquor produced in most cases does not require filtering before being utilized or processed. The retention of fines, normally lost in the washing operation, will increase the plasticity of the material. Since heat is not required in the operation, any volatile constituents present are retained.

When the solid portion of the heat-treated and subdivided ligno-cellulose material is to be made into products such as sheet or board products, the solid material remaining after the extraction of the liquor containing water solubles is ordinarily admixed with a relatively large proportion of water, such as 98% of water, and formed into a pulp from which it is formed into a wetlap by any suitable forming machine, and from such wetlap the board or sheet is produced in any of the ways well known in the art. This solid material may, however, be made use of without forming into a pulp with water, as in the case of ligno-cellulose material which has been heat-treated sufficiently to effect predominate conversion to plastic state, and which can be taken directly after expression of the liquor with preferably a slight drying for grinding and other operations suitable for making plastic products. The present invention thus in no way interferes with making products of the solid heat-treated ligno-cellulose material by routes involving pulping with water, and, in operations for making products where pulping with water is not required, it may be of advantage in that extensive drying operations are avoided.

The liquor, containing water solubles in the high concentration so obtained or further concentrated by evaporation of water, may be used directly as a binder material for briquettes and for a variety of other purposes, but is preferably subjected to treatment for recovery of valuable constituents, its concentrated state being substantially ideal for recovery of constituent materials, which may be regarded as being in the nature of by-products when viewed from the standpoint of manufacture of commercial ligno-cellulose products, such as boards, plastic material, etc.

However, the heat treatment can be carried out for such long times, as for example with gum wood chips at 1000 lbs. steam pressure (285° C.) for over 20 seconds at full pressure, or at 600 lbs. steam pressure (252° C.) for over 60 seconds, that the solids are discarded because they are slimy and not well adapted for making board and other products such as referred to above, and in such case the water solubles constitute the principal product instead of a by-product.

The water soluble materials represent hydrolyzed materials from the wood or other ligno-cellulose material taken for treatment. Such hydrolyzed materials come largely from the beta cellulose, pentosans, and hemi-celluloses, and others apparently are produced from the alpha-cellulose and the lignin. Thus with use of high steam pressure these water soluble materials are formed from the fiber structure of the ligno-cellulose material. When wood is taken as the starting material, it may contain resins, gums and the like, which contribute to the content of water solubles recovered.

These various products of hydrolysis are not only valuable in themselves in some cases, but also with appropriate treatment other valuable derivative products can be obtained.

The pentosans, for example, can be hydrolyzed to produce furfural, and such hydrolysis is accomplished, at least to a partial extent, in the heat treatment and exploding with steam already referred to. The liquor contains wood acids as acetic, formic, propionic and other higher fatty acids. These acid constituents may occur in various forms, as in the form of calcium salts or sodium salts or other salts and in organic combinations.

The following is illustrative of some of the many treatments to which the expressed liquor can be subjected for yielding products of value.

The expressed liquor is preferably cooked for about two hours with live steam at a pressure of about 60 lbs. per sq. in. (about 152° C.) preferably with the addition of a reactive agent, such as about ½% of sulfuric acid, whereby the hydrolysis is continued with formation of additional quantities of both furfural and acetic acid.

Before or after such cooking or other treatment, the furfural can be obtained by fractional distillation, and acids, principally acetic acid, can also be obtained by this route, or these acetic and other acids can be recovered from their salts, forming part of the still residue remaining after the furfural is removed, as by redistillation with strong acids.

Other recoverable constituents or derivatives include aldehydes other than furfural, alcohols, and other like materials. From the fermentable sugars in the liquors ethyl alcohol and the like may be secured by fermentation. By oxidation oxalic acid and compounds of this type may be formed, and yet other products, such as malic, succinic, and the like acids may be formed.

Where pine wood is used as the starting material, the liquor may contain colloidal material which, however, can be removed if desired in several ways, as for example, by coagulating or clarifying agents.

Tar-like bodies may remain after the fractional distillation or the like treatment and numerous derivatives can be made therefrom, such as oxalic acid. However, formation of tar-like bodies may be prevented if desired by treatment with strong oxidizing acids or clarifying agents, such as lead acetate, stannous chloride and the like.

Various other materials and derivatives thereof can be obtained in a variety of ways, it being readily understood that the foregoing are referred to merely for purposes of illustration and for affording an understanding of ways in which the liquor produced by the present invention can be utilized.

It will be observed that by the invention a many-fold advantage is obtained in that water requirements are reduced and stream pollution is avoided or greatly lessened, the quantity of stock and product, such as boards and the like, is increased by retention of the solid fines which also give increased plasticity, and water soluble materials are recovered which are of value either directly or by being converted into derivatives of value.

I claim:

1. Process of making board products with production of liquor suitable for the making of by-products therefrom, which consists in subjecting fibrous ligno-cellulose material in coarsely subdivided state and containing a relatively low percentage of water to the action of steam at pressures of approximately 600–1000 pounds per square inch and corresponding temperatures whereby a substantial part of the fiber constituents of said material is converted to water solubles, further subdividing said steam-treated material, and then subjecting the material so obtained and containing water coming from the relatively low percentage thereof in the material originally taken for treatment and some water from the steam treatment, without added water, to a mechanical expression treatment whereby a liquor is expressed containing water-solubles in relatively concentrated state, forming the material from which water-solubles have been so expressed into sheets and making the sheets into board products whereby the board products are low in content of water-solubles and washing out of the expressed water-solubles is avoided.

2. Process as claimed in claim 1, and wherein the final subdivision of the steam-treated ligno-cellulose material is effected by explosive discharge thereof from the region of high steam pressure to a region of lower pressure as atmospheric pressure.

3. Process as claimed in claim 1, and wherein the ligno-cellulose material is wood.

4. Process as claimed in claim 1, and wherein the subjection to action of the steam is for a period of time not materially exceeding one minute at steam pressure of 600 pounds per square inch to 20 seconds at a steam pressure of 1000 pounds per square inch.

5. Process as claimed in claim 1, and wherein the mechanical expression treatment is repeated with feeding back of liquor expressed whereby increased expression of water-solubles is effected.

6. Process as claimed in claim 1, and wherein the final subdivision of the steam-treated ligno-cellulose material is effected by explosive discharge thereof from the region of high steam pressure to a region of lower pressure as atmospheric pressure, and wherein the mechanical expression treatment is repeated with feeding back of liquor expressed whereby increased expression of water-solubles is effected.

ROBERT M. BOEHM.